Figure 1:
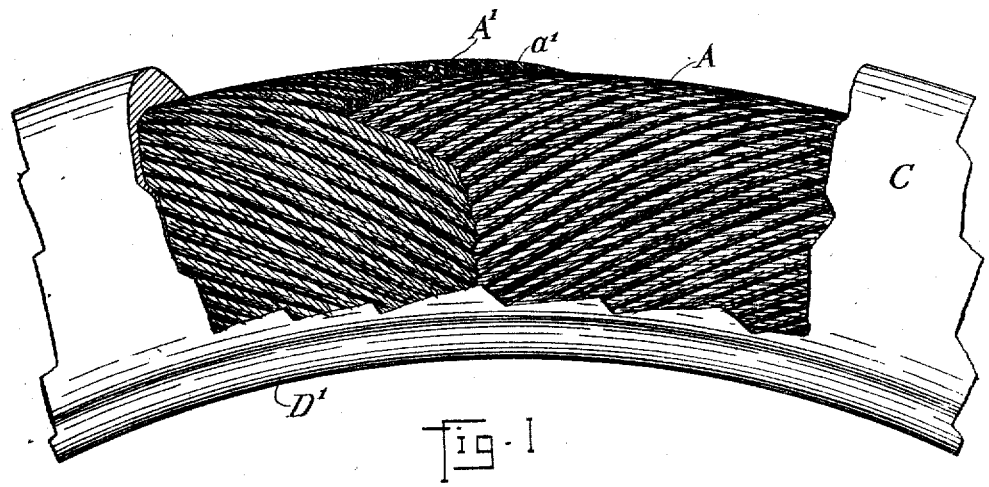

J. D. TEW.
PROCESS OF MAKING TIRE CASINGS.
APPLICATION FILED AUG. 13, 1914.

1,242,270.

Patented Oct. 9, 1917.
3 SHEETS—SHEET 2.

Witnesses
Archer W. Richards
Justin W. Machlin

Inventor
James D. Tew
By Albert H. Bates, Attorney

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

PROCESS OF MAKING TIRE-CASINGS.

1,242,270.  Specification of Letters Patent.  Patented Oct. 9, 1917.

Application filed August 13, 1914. Serial No. 856,621.

*To all whom it may concern:*

Be it known that I, JAMES D. TEW, a citizen of the United States, residing at Akron, in the county of Summit and State of Ohio, have invented a certain new and useful Improvement in Processes of Making Tire-Casings, of which the following is a full, clear, and exact description, reference being had to the accompanying drawings.

This invention relates to a method of making tire casings of cords of sufficiently large size so that a few layers of cords (preferably two) shall be sufficient to give the required strength in the casing. Tires are ordinarily made of canvas or other strong woven fabric, a sufficient number of plies being used one on top of another to furnish the required strength—as many as eight plies being employed in the larger sizes of tires. They have been made also of many twisted threads laid parallel to each other either circumferentially or transversely of the tire, or at any intermediate angle, a considerable number of plies of such parallel threads being used as in the canvas tire, to build up the required structure.

Another method of making tire casings consists in using cords of a sufficiently large size so that two plies only of such cords laid transversely of the casing from one bead to the other, shall furnish the required strength. In such casings the cords usually cross the plane of the tire obliquely, being laid at such angle as is determined by the particular requirements of the tire; the cords in the two plies crossing each other at complementary angles. There are great advantages in using but two plies, as such structure reduces the internal friction and gives greater durability and efficiency. But the two-ply cord tires as heretofore produced have had compensating disadvantages which will be apparent from the following considerations.

When cords of a large diameter are used the greater circumference at the tread than at the bead results in openings between the cords at the tread, though the cords are laid in close contact at the bead. This opening, if round cords are used, is so large as to be seriously detrimental to the tire, requiring an excess of rubber to properly fill the spaces between the cords and to bind them together. This excess of rubber tends to weaken the tire by causing a tendency of the cords to separate, due to the action in the tire structure when in use, and the resulting destruction of the tire. A certain amount of rubber between the cords at and near the tread of the tire is desirable, imparting to the tire a high degree of resiliency and making it very efficient in its consumption of power in use; but this intermediate rubber must be definitely limited to an amount very materially less than would be required if round cords are used.

In order to overcome the difficulty stated, tires have been made of flattened cords which are laid edgewise to the plane of the tire at the bead and turned flatwise on the tread to cause them to occupy a greater width and thereby filling the structure notwithstanding the larger periphery at the tread; but such cords are difficult to manipulate in the construction of the tire, and they unduly thicken the sides of the tire, reducing its flexibility. Moreover, there is danger of injury to the cord in flattening it, where, as heretofore, the flattening has been accomplished by passing a round cord between hard unyielding rolls.

In my process I build up the tire casing of round cord laid at the required angle on a former, to form a ply. This ply as laid has relatively wide gaps between the cords at the tread portion of tire, which I close to the required degree by flattening the cords by pressure after the cords are laid. To render the cord more easily flattened, I employ, preferably, a hollow cord of sufficient stiffness to retain its shape while being laid but which is soft and flexible enough to be easily flattened according to the space provided for it without unduly straining the material of the cord. My process, therefore, consists broadly of the steps of placing soft or hollow cords in position for a tire casing being formed and flattening such cords while they are in place. The process includes also other preferred steps, as hereinafter explained.

In the preferred way of carrying out the process I wind a hollow rubber-impregnated cord spirally with a large lead about an annular former which has been covered by a rubber envelop. This produces a ply or layer of cord lengths. The cord lengths are approximately round when laid and are of sufficient stiffness to hold their shape while being laid, but, when in place, are submitted to pressure to flatten them as desired. The first ply of cords is surmounted by a sheet of rubber and another ply of hollow cords is placed outside of this with its individual cord lengths crossing those of the first ply. The second ply of cords is also flattened, and outside of it are placed the usual tread and finishing portion of the tire. The pressure which flattens the cords may be applied to each layer before a subsequent layer is laid, by external rolling pressure or by blows, as hereinafter described, or the various layers may be flattened together by pressure,—for example, that due to the usual vulcanizing process against an external mold.

The hollow cord which I use in carrying out my process is preferably made by twisting rubber-impregnated strands about a hollow center and cementing them together. Such cord forms the subject-matter of my co-pending application No. 800,337, filed November 11, 1913. The tire casing produced with such cord and by the present process is the subject-matter of my co-pending application No. 833,248, filed April 20th, 1914.

Figure 2:
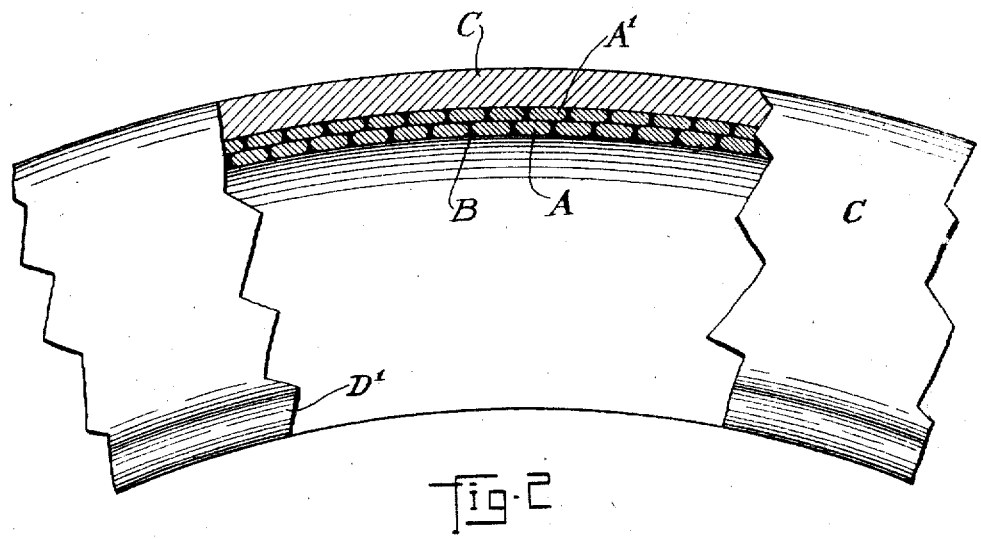
Figure 3:
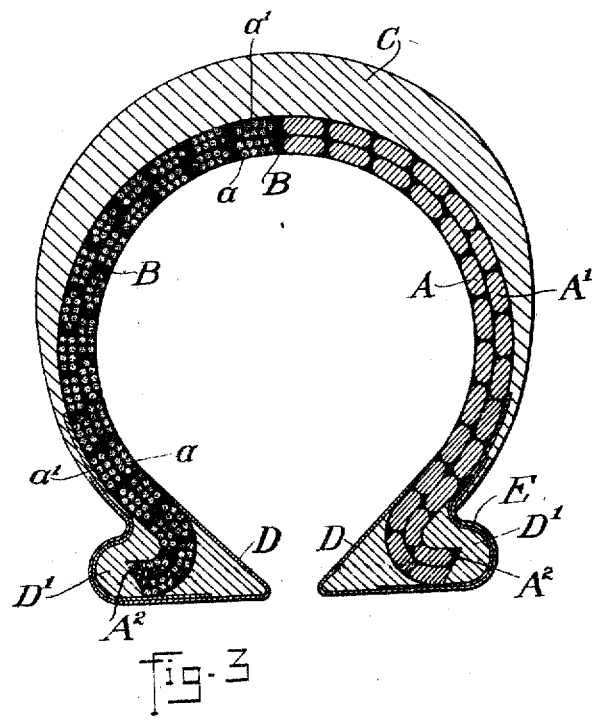
Figure 5:
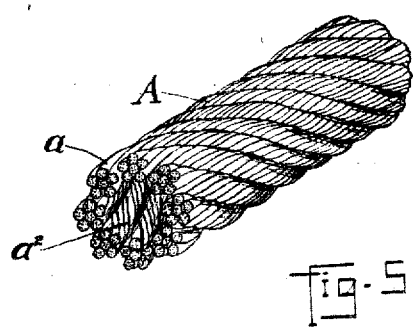
Figure 4:
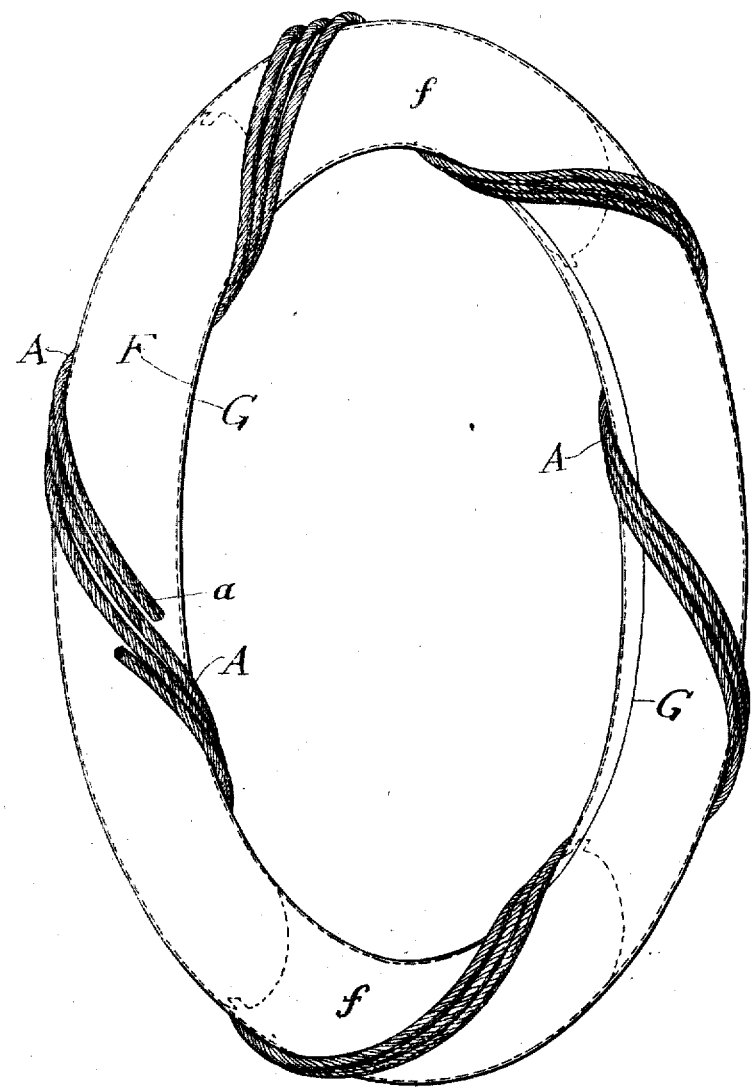

In the drawings, Figure 1 is a side elevation of a portion of a tire constructed by my process, the outer rubber tread and also part of the outer ply of cords being broken away; Fig. 2 is a sectional side elevation of a portion of such tire, the section being taken in the mid-plane of the tire. In this view the flattened cords are shown conventionally, instead of the individual strands showing, as in Fig. 1; Fig. 3 is a cross section of the tire. In this view half of the cords are shown as made up of individual strands, and the others are shown conventionally. Fig. 4 is a perspective view, on a smaller scale, of the annular former and some of the cords constituting the first ply, this view illustrating the manner in which the cords are laid; Fig. 5 is a perspective view of a section of the cord on an enlarged scale.

Referring first to the completed tire as illustrated in Figs. 1, 2 and 3, A represents the inner ply made of hollow, twisted, flattened cords, and $a'$ individual strands thereof. Such a cord, before flattening, is shown on an enlarged scale in Fig. 5, where $a$ indicates the individual strands and $a^2$ the hollow center or bore. As above mentioned, these hollow, twisted cords are composed of cemented strands individually impregnated with rubber.

B, in the drawings, indicates rubber which fills the space between the cords of each ply and between the plies of cords. Surmounting the outer ply of cords, in the completed tire, is the usual rubber tread portion C extending down onto the sides of the tire. Near their inner ends the cord plies are turned outwardly, as shown at $A^2$ and are embedded in the beads consisting of inward extensions D and clenchers $D^1$. The beads are preferably covered with one or more layers of fabric E which extend about them and beneath the inner edge of the rubber cover C. Such beads constitute the usual means of clenching the tire to the rim.

In Fig. 4, F indicates a suitable former, which consists of an annular ring, the cross section of which may be round or somewhat oval and which is made up of separable sections $f$. In the manufacture of the tire, a cover of sheet rubber G is first put on the former, and the round hollow cord A is wound about the same to make the first ply.

In the preferred operation of my process, I wind the round cord, constituting the inner ply A, continuously in a spiral of considerable pitch about the former, so as to make several trips completely around the former to finish the ply. When this ply is completed the cords are flattened. This may be done by pressing a roller against them as the former is revolved. This roller is yieldingly pressed against the cords, either by hand or by any suitable mechanism, and is traversed to cover the whole surface of the ply. A layer of rubber is then placed over this and then the next ply is wound in the same manner but in the opposite direction; and flattened; then a layer of rubber is placed over it, and the usual breaker strip and tread are applied. After the structure is thus completed it is severed along the inner periphery of the former, and the former is collapsed and removed. Then the severed ends of the plies are turned outwardly, as shown in Fig. 3, and the beads are formed thereon. The whole casing is then vulcanized with the usual internal pressure.

If desired, instead of rolling the applied cords to flatten them, they may be left round until the casing is vulcanized, the internal pressure applied to the casing in the process of vulcanization effecting the flattening. I have produced the best results, however, by flattening them either by rolling pressure during the building up of the casing or by hammering the cords with light rapid blows, as for instance by the use of a pneumatic hammer. This latter method presents the advantage of having less tendency to displace the cords transversely than the rolling, leaving them after flattening exactly in the position in which they were laid.

It will be seen that by my process a tire having flattened cords may be made with great rapidity and without subjecting the cords to undue strain. The laying of round cords is a much simpler matter than to lay flat ones, and by employing a hollow round cord, which is stiff enough to retain its shape when laid but is capable of being flattened under pressure, I am enabled to produce the desired flat cord structure while availing myself of the ease of laying appertaining to round cords. Moreover, because my cords are flattened after being put in position I can maintain just the desired amount of rubber between the different reaches and can also obtain more nearly a uniform thickness throughout the structure, increasing the efficiency and desirability of the product produced.

Having thus described my invention, what I claim is:

1. The method of manufacturing tire casings by the use of cord, comprising the steps of laying cord lengths side by side about a transversely curved former to make an annular ply of substantially tire shape, and flattening a portion of each cord length following the laying thereof.

2. The process of the character set out in claim 1, wherein each portion of the cord when laid is round but is of such character that it may be flattened by moderate pressure.

3. The process of the character set out in claim 1, wherein a hollow cord is employed whereby it may be readily flattened in place.

4. The process of making tire casings comprising laying cord lengths about an annular former to build up a ply and flattening each cord in the region of the tread by pressure from the outside directed inwardly and opposed by the former.

5. The process as set out in claim 4, wherein a round cord is employed of sufficient stiffness to hold its shape while being laid but adapted to be flattened by a comparatively moderate pressure during the process of making the carcass.

6. The process of making carcasses for tire casings comprising the laying of cord lengths about a tire shaped former to make a plurality of annular plies of cord with the cord lengths in one ply being at an angle to those in its adjacent ply, and applying pressure to a portion of each cord length following the laying of such portion to cause it to be flattened in the region of the tread.

7. The process of making tire casings, consisting of laying about an annular substantially tire shaped former cord lengths to form a ply, thereafter surmounting this with another ply of cord lengths, thereafter completing the formation of the casing and vulcanizing it, and during the process described flattening each cord in the vicinity of the tread.

8. The process of making tire casings comprising winding spirally about an annular former a cord to make a ply, winding over this a second ply with the cords extending at substantially right angles to those of the first ply, slitting the two plies on the inner periphery of the former, applying the beads and thread portions and vulcanizing the casing, and during the process described flattening the cord by external pressure opposed by the former.

9. The process of making tire casings consisting of winding onto an annular former a hollow cord to make a layer of cord-lengths side by side and thereafter by pressure flattening such cords when in place.

10. The process of making tire casings consisting of winding about an annular former a round cord of sufficient stiffness to hold its shape while being laid, and after such cord is laid submitting the same to pressure sufficient to flatten the cord.

11. The process of making tire casings comprising winding spirally about a former a hollow twisted rubber impregnated cord, and after said cord is in place flattening the same.

12. The process of making tire casings consisting of winding spirally about an annular former a hollow rubber impregnated cord of sufficient stiffness to hold its shape while being laid, and after such cord is laid submitting the same to pressure sufficient to flatten the cord.

13. The process of making tire casings, comprising making an annular layer of hollow cords, submitting such cords to pressure to flatten them, and forcing rubber into the spaces between them.

14. The process of making tire casings consisting of winding spirally about an annular former covered with a rubber envelop a hollow twisted rubber-impregnated cord of sufficient stiffness to hold its shape while being laid, and after the same is laid submitting it to pressure sufficient to flatten the cord lengths and force some of the rubber of such envelop between adjacent lengths.

15. The process of making tire casings comprising laying a ply of hollow cords, flattening such cords by pressure after the cords are in place, and covering such cords with a sheet of rubber which is pressed into the spaces between the cords.

16. The process of making tire casings comprising forming a layer of spirally wound hollow cord, flattening such cord when in place, surmounting the same by a sheet of rubber and covering this with a second layer of hollow cords extending in a diagonally opposite direction and flattening the latter cords when in place.

17. The process of making tire casings consisting of winding a cord about an annular former to make a layer of cords, flattening portions of such cords following the laying of the same by pressure directed inwardly toward the former, severing the annular tube produced along the inner periphery thereof, and turning out the edges adjacent to the severing line to form beads.

18. The process of making tire casings consisting of winding a hollow cord about an annular former covered by a rubber envelop to make a layer of cords, flattening the cords when in place, surmounting such layer by a sheet of rubber, winding onto it a second layer of hollow cords extending in another direction, flattening the latter cords when in place, severing the annular tube produced along the inner periphery thereof, and turning out the edges adjacent to the severing line to form beads.

19. The process of making tire casings having cords in two plies only, consisting of laying lengths of relatively large cord side by side about a tire shaped former for each ply and flattening such cord in the vicinity of the tread portion following the laying thereof.

20. The process of making tire casings having cords in two plies only, consisting of laying lengths of relatively large cord side by side, about a substantially tire shaped former flattening such cord lengths at the tread portion after they are laid, surmounting such ply of cords by a second ply of large cord, the individuals of which cross the individuals of the first ply, flattening the second ply, and placing rubber outside of the second ply.

21. The herein described method of manufacturing a tire casing carcass consisting of wrapping a plurality of superimposed plies of parallel flexible cords completely around a ring core; then flattening the cords in that portion of their lengths disposed at the apex of the carcass; then slitting the carcass thus formed along its inner circumference and removing the ring core.

22. The herein described method of manufacturing an outer tire casing consisting in applying to a ring core of circular cross section a plurality of plies of parallel flexible cords so as to completely encircle the ring core; the cords of each ply being laid at an angle in respect to the circumferential surface of the core, and the cords of the plies being at a reverse angle in respect to one another; then flattening the cords along the apex of the carcass while in place on the core substantially as described.

23. The process of making tire casings comprising the laying of cord lengths side by side about a substantially tire shaped former, the cord lengths being round when the laying of them begins, and flattening such cord lengths against the former in the region of the tread before vulcanization of the carcass.

24. The process of making tire casings comprising laying a plurality of cord lengths about a tire-shaped former, to build eventually a plurality of plies of cord, and pressing each length at its tread portion against such former to flatten it in place before the casing is vulcanized.

25. The process of making tire casings comprising winding cord about a former to make a ply thereof, surmounting such ply by another ply of cord, adding the rubber tread portion and vulcanizing the casing, and widening said cords by pressure in the vicinity of the tread after the laying begins and before vulcanization.

26. The process of making tire casings consisting of making an annular substantially tire shaped ply of soft cords lying side by side, said cords having sufficient stiffness to hold their shape while being laid, and flattening portions of each cord after such portions are laid, and thereafter repeating the operation for another ply with the cords extending at an angle to those of the first ply, then completing the casing and vulcanizing it.

27. The process of making tire casings comprising laying about an annular former a plurality of plies each consisting of hollow cord lengths side by side, and flattening portions of each cord after such portion is laid.

28. The process of making tire casings comprising laying about an annular former a plurality of plies each consisting of hollow twisted rubber-impregnated cords, and each cord being flattened in certain regions after such region has been placed about the former.

29. The process of making tire casings consisting of winding onto an annular former a hollow twisted rubber-treated cord to make a layer of cord lengths side by side, and winding about the layer described a second layer of hollow twisted rubber-treated cord, with the cord lengths extending at an angle to the lengths of the first ply, and thereafter completing the formation of the casing and vulcanizing it, and during the operation described flattening the cords in the region of the tread.

In testimony whereof, I hereunto affix my signature in the presence of two witnesses.

JAMES D. TEW.

Witnesses:
WALTER K. MEANS,
ILLA N. KIRN.